(12) United States Patent
Shi et al.

(10) Patent No.: US 10,890,162 B2
(45) Date of Patent: Jan. 12, 2021

(54) WIND ENERGY, WAVE ENERGY AND TIDAL ENERGY INTEGRATED POWER GENERATION SYSTEM BASED ON MONOPILE FOUNDATION

(71) Applicant: DALIAN UNIVERSITY OF TECHNOLOGY, Dalian (CN)

(72) Inventors: Wei Shi, Dalian (CN); Dezhi Ning, Dalian (CN); Lin Zhou, Dalian (CN); Yanghai Nan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/495,047

(22) PCT Filed: Feb. 28, 2018

(86) PCT No.: PCT/CN2018/077525
§ 371 (c)(1),
(2) Date: Sep. 17, 2019

(87) PCT Pub. No.: WO2019/091022
PCT Pub. Date: May 16, 2019

(65) Prior Publication Data
US 2020/0095982 A1 Mar. 26, 2020

(30) Foreign Application Priority Data
Nov. 9, 2017 (CN) .......................... 2017 1 1099764

(51) Int. Cl.
*F03D 9/00* (2016.01)
*F03B 13/14* (2006.01)
*F03B 13/26* (2006.01)

(52) U.S. Cl.
CPC ............ *F03D 9/008* (2013.01); *F03B 13/142* (2013.01); *F03B 13/262* (2013.01)

(58) Field of Classification Search
CPC . F03D 9/008; F03D 13/25; F03D 1/00; F03B 13/142; F03B 13/262; F03B 13/26;
(Continued)

(56) References Cited

U.S. PATENT DOCUMENTS 6,652,221 B1 * 11/2003 Praenkel ............... F03B 17/061
415/3.1
8,438,844 B2 * 5/2013 McCarthy ............... F03B 13/24
60/398

(Continued)

FOREIGN PATENT DOCUMENTS

| CN | 101915202 A | 12/2010 |
|---|---|---|
| CN | 102182635 A | 9/2011 |

(Continued)

*Primary Examiner* — Julio C. Gonzalez
(74) *Attorney, Agent, or Firm* — Muncy, Geissler, Olds & Lowe, P.C.

(57) ABSTRACT

A wind energy, wave energy and tidal energy integrated power generation system based on monopile foundation, in which the wind energy, wave energy and tidal energy will share the support structure and power transmission system, belongs to the technical field of ocean renewable energy utilization. An integrated power generation system which integrates wind energy converter, oscillating water column wave energy converter and horizontal-axis tidal energy converter is established based on the monopile support structure. The invention makes sufficient use of offshore renewable resources, so as to improve the utilization ratio of monopile foundation and reduce the total cost of power generation of integrated system. The novel integrated power generation system improves the effective utilization of the ocean areas, reduces the cost of construction and maintenance, makes full use of the existing mature wind energy technology, and promotes the commercialization of wave energy converters and tidal energy devices.

14 Claims, 2 Drawing Sheets

(58) Field of Classification Search
CPC ......... Y02E 10/28; Y02E 10/32; Y02E 10/38;
Y02E 10/728; Y02P 70/523
See application file for complete search history.

(56) References Cited

U.S. PATENT DOCUMENTS

| | | | | |
|---|---|---|---|---|
| 8,866,320 | B2 * | 10/2014 | Perregrini | F03D 9/12 |
| | | | | 290/42 |
| 2002/0182946 | A1 * | 12/2002 | Tanaka | F03D 13/25 |
| | | | | 440/6 |
| 2005/0134050 | A1 * | 6/2005 | Salls, Jr. | F03D 13/25 |
| | | | | 290/54 |
| 2006/0171798 | A1 * | 8/2006 | Yamamoto | F03D 13/25 |
| | | | | 415/4.5 |
| 2007/0228739 | A1 * | 10/2007 | Kraczek | F03D 9/17 |
| | | | | 290/53 |
| 2009/0267347 | A1 * | 10/2009 | Abatemarco | F03B 17/061 |
| | | | | 290/43 |
| 2010/0219645 | A1 * | 9/2010 | Yamamoto | F03D 9/25 |
| | | | | 290/55 |
| 2012/0305411 | A1 * | 12/2012 | Elazari-Volcani | |
| | | | | H02K 7/1823 |
| | | | | 206/0.6 |

FOREIGN PATENT DOCUMENTS

| | | | |
|---|---|---|---|
| CN | 103967714 A | 8/2014 | |
| CN | 104229085 A | 12/2014 | |
| CN | 104832374 A | 8/2015 | |
| CN | 105673299 A | 6/2016 | |
| CN | 107725259 A | 2/2018 | |
| CN | 207485595 U | 6/2018 | |
| JP | 59145373 A * | 8/1984 | ............ F03B 13/142 |
| WO | WO 2006/010783 A1 | 2/2006 | |

* cited by examiner

WIND ENERGY, WAVE ENERGY AND TIDAL ENERGY INTEGRATED POWER GENERATION SYSTEM BASED ON MONOPILE FOUNDATION

FIELD OF THE INVENTION

The present invention belongs to the field of offshore renewable energy utilization technologies, and in particular relates to wind-wave-tidal integrated power generation system. It is an integrated power generation system composed by wind energy converter, the oscillating water column wave energy converter and tidal energy converter based on monopile foundation.

BACKGROUND

Offshore wind energy, wave energy and tidal energy are all offshore renewable energy resources. Offshore wind power has become a new direction of international wind power development and attracted much attention all over the world. The development of offshore wind energy is of great significance to reduce the air pollution and reconstruct the energy mixture. Area with strong wind is usually also rich in wave energy. The tidal power generation is rapidly developed these years due to its less effect from the weather on the power output and stable power output. However, wave energy and tidal energy device is limited for its commercialization because of the low energy conversion efficiency, high power generation costs, as well as low reliability. Among the foundations used in offshore wind farms, the monopile foundation is widely used because of its low construction cost, easy installation, no need for seabed preparation, high adaptability, and other advantages. Until now, the 80% installed offshore wind turbines use monopile foundation. With the maturity of the installation equipment and installation technology in China, monopile foundation' prospects in China's offshore wind power industry is extremely wide. Wave power generation device mainly includes pelamis, point absorber buoy, the oscillating water column, oscillating wave surge converter, the overtopping device. The tidal power generation device mainly includes horizontal and vertical axis power generation devices.

The multi-use of offshore wind power with the wave energy resources and tidal energy resource will effectively increase the power generation capacity of offshore wind farms. Thus it also can improve the economy and promote the commercialization of wave energy and tidal energy devices so that it is an effective approach to realize the comprehensive utilization of the offshore renewable energy and reduce power generation cost.

SUMMARY

The present invention provides a wind energy, wave energy and tidal energy integrated power generation system based on monopile foundation in which the power transmission system and the support structure can be shared by three energy converter devices. An integrated power generation system which integrates wind energy converter, oscillating water column wave energy converter and horizontal-axis tidal energy converter is established based on the monopile support structure. The present invention makes sufficient use of offshore renewable resources, so as to improve the utilization ratio of monopile foundation and reduce the total cost of power generation of integrated system. At the same time, the overall economy of offshore wind farms is also increased and the cost of wind, wave and tidal power generation is reduced.

The Technical Solution of the Invention

A wind energy, wave energy and tidal energy integrated power generation system based on monopile foundation is a power generation system which integrates the wind energy, oscillating water column wave energy as well as the horizontal axis tidal energy based on monopile foundation. The power generation system includes a monopile-type wind turbine system, an oscillating water column wave energy converter 4 and a horizontal axis tidal energy converter, as well as wave energy converter at the mean sea level around the monopile and a tidal energy converter below the mean sea level underwater.

The monopile-type wind turbine system comprises a wind turbine 1, tower 2, monopile foundation 6 and power transmission system; the wind turbine 1 is connected to monopile foundation 6 by tower 2. The monopile foundation is 6 is fixed to the seabed 7; the oscillating water column wave energy converter 4 is fixed onto the monopile foundation 6 by first sleeve 3; the horizontal axis tidal energy converter comprises outrigger structure and tidal energy generator. Two tidal generator 12 are installed at the both ends of outrigger structure 14. The center of the outrigger structure is connected to the monopile foundation 6 by a second sleeve 13. By adjusting the plane of the tidal energy converter, the axial direction of the tidal energy generator 12 is consistent with the direction of the incoming flow.

The oscillating water column wave energy converter 4 comprises a cover body of the wave energy converter, wave inlet 8, air chamber 10, and an air turbine generator 11; the air chamber 10 is located inside of the cover body. The wave inlet 8 is set up at one side of the wave energy converter. The air turbine generators 11 are installed at the air outlets respectively which are at the top of the wave energy converter. When the wind energy, wave energy and tidal energy integrated power generation system based on monopile foundation starts to work, the integrated power generation system is put into the water. Under the action of waves, the water enter into the air chamber 10 through the wave inlet 8 to form an oscillating water column 9 that oscillates in vertical direction. The oscillating water column 9 moves up and down so that the air in the air chamber 10 reciprocates through the air outlet at the top of the air chamber 10, and then drives the air turbine generator 11 to generate electricity.

The air chamber 10 is conical structure to make sure the increasing of pressure at the end of the air flow so that the air flow could drive the air turbine generator 11 to rotate faster and the power generation efficiency is improved.

The wave inlet 8 is in the same direction as the dominant direction of the wave to improve the conversion efficiency.

The air turbine generator 11 is the dual-direction air turbine generator.

The wind turbine 1 is a megawatt (MW) horizontal axis wind turbine.

The tidal energy generator 12 is a horizontal axis tidal energy converter.

The present invention makes sufficient use of the monopile foundation of the stationary turbine. The wind energy, wave energy and tidal energy will share the support structure and power transmission system.

The wind energy, wave energy and tidal energy integrated power generation system based on monopile foundation of the present invention is an axisymmetrical structure with respect to monopile, thus the wave loads appropriate amount is reduced. Left-right symmetric distribution of two tidal energy generators could reduce the instability of the loads.

Advantages of the Invention

1. The monopile wind turbine has the advantages of simple structure, construction convenience, low construction cost and wide application.
2. Combining offshore wind power with wave power generation device and tidal power energy generator is a good solution to share offshore platform, transmission equipment so that the overall power output of the system is increased; the generation electricity capacity and effective working hours are increased, and the investment cost is reduced.
3. The air chamber 10 is the conical structure, thus the wave loads are reduced and the system reliability is improved.
4. The novel wind energy, wave energy and tidal energy integrated power generation system based on monopile foundation will improve the effective utilization of the water area and reduce the construction and maintenance costs. It makes full use of existing mature wind turbine technology and promote the commercialization of the wave energy converter as well as tidal energy device. It is a reliable offshore renewable energy generation platform.

where: 1 wind turbine; 2 tower; 3 first sleeve; 4 oscillating water column wave energy converter; 5 mean sea level; 6 monopile foundation; 7 seabed; 8 wave inlet; 9 oscillating water column; 10 air chamber; 11 air turbine generator; 12 tidal energy generator; 13 second sleeve; 14 outrigger structure.

DETAILED DESCRIPTION

Figure 1:
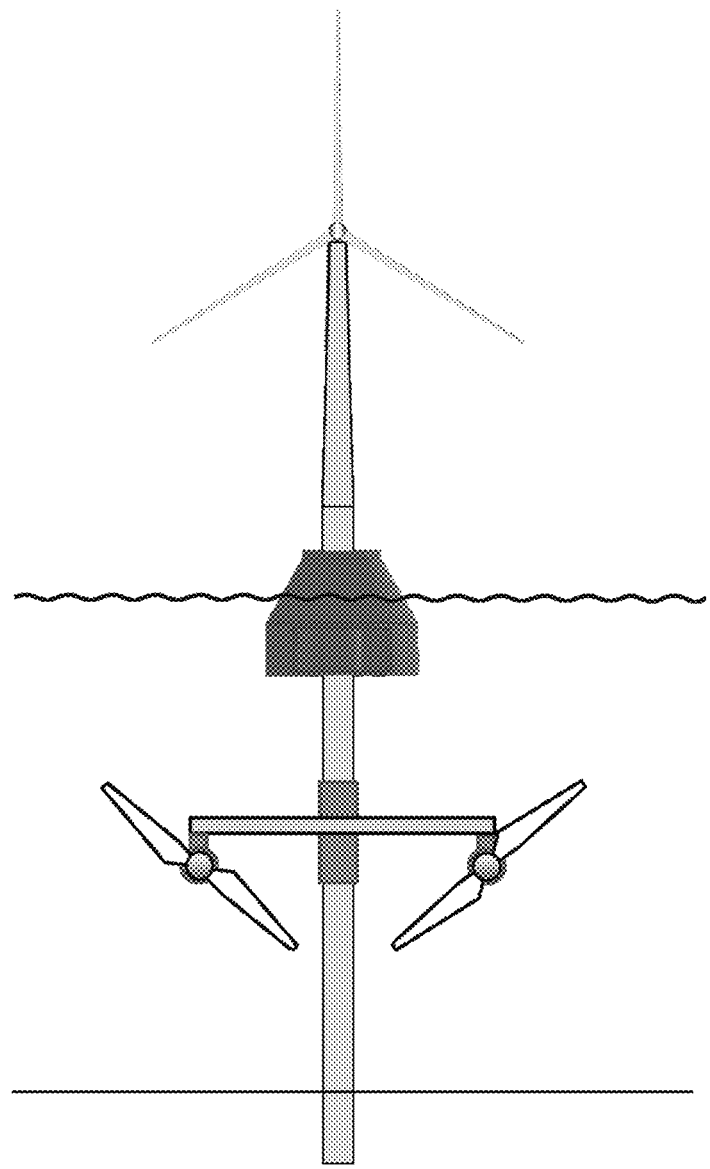
FIG. 1 is the structural chart of wind energy, wave energy and tidal energy integrated power generation system based on monopile foundation of the invention.
Figure 2:
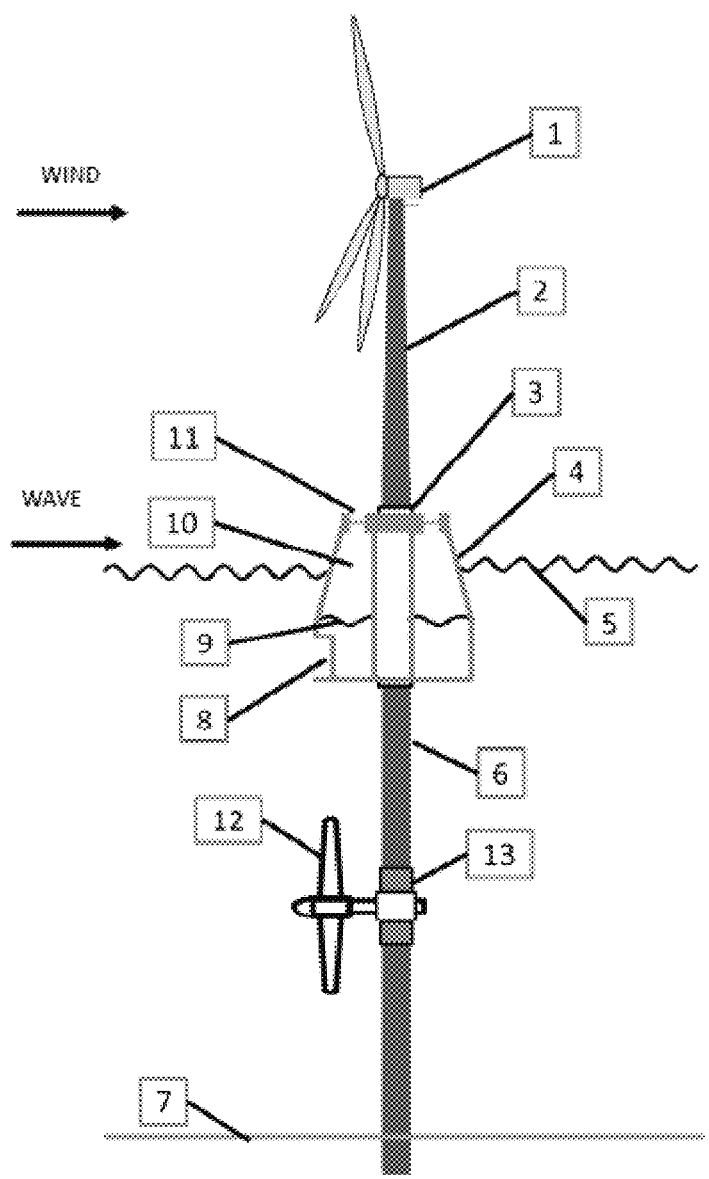
FIG. 2 is the side view of wind energy, wave energy and tidal energy integrated power generation system based on monopile foundation of the invention.
Figure 3:
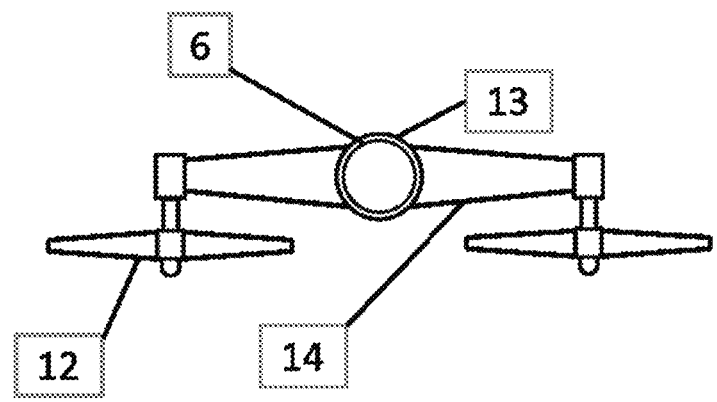
FIG. 3 is the local top view of wind energy, wave energy and tidal energy integrated power generation system based on monopile foundation of the invention.

For further understand the invention, based on the drawings and technical solution, the present invention will be further described as below:

FIGS. 1 and 2 show the embodiment of the wind energy, wave energy and tidal energy integrated power generation system based on monopile foundation of the invention of the present invention.

As shown in FIG. 1, horizontal axis wind turbine 1 is connected to the monopile foundation 6 and seabed 7 by tower 2. Wave energy generation device is an oscillating water column wave energy converter 4 which is located near the mean sea level around the monopile foundation 6 and fixed to the monopile foundation 6 by the first sleeve 3. The first sleeve 3 aims to protect the monopile foundation 6. The two tidal energy generator 12 are installed at the two ends of the outrigger structure 14. The center of the outrigger structure 14 is connected to the monopile foundation 6 by a second sleeve 13. By adjusting the plane of the tidal energy converter, the axial direction of the tidal energy generator 12 is consistent with the direction of the incoming flow. The wind turbine 1 performs a rotary motion under the driving of the wind flow, converts the wind energy into mechanical energy, and then drives the wind turbine 1 to generate electricity through the gear box. On the other hand, the oscillating water column 9 in the oscillating water column wave energy converter 4 reciprocates under the action of an external force of wave undulation, and is converted into a reciprocating motion of the air in the air chamber 10, thereby driving the air turbine generator 11 to generate electricity. If the dual-direction air turbine generator is used, the whole wave moves up and down can be used for the power generation, with good continuity and high efficiency. Tidal energy generators 12 are set at the two ends of the outrigger structure. The central position of the outrigger structure 14 is connected to the monopile foundation 6 through a second sleeve 13. By adjusting the plane of the tidal energy converter, the axial direction of the tidal energy generator 12 is consistent with the direction of the incoming flow.

The process is: the wind turbine 1 driven by wind flow will produce the electricity; oscillating water column wave energy converter 4 is fixed to monopile foundation 6 through the first sleeve 3. The wave rising up to the wave inlet 8 gets into oscillating water column wave energy converter 4. The oscillating water column 9, which oscillates in vertical direction, pushes the air in air chamber 10 to pass through the air outlet back and forth to drive the air turbine generator 11 to generate electricity. Two symmetric tidal energy generator 12 rotate under the action of incoming water flow to generate electricity. The electricity from wind energy, wave energy and tidal energy will be collected and transmitted to the user by the transmission system.

The installation process is given as follows: First, the monopile foundation 6 is installed into the seabed by using existing offshore wind turbine installation technology. Then the sleeve is installed on the monopile foundation 6. The outrigger structure 14, tidal energy generator 12 and oscillating water column wave energy converter 4 which have been assembled onshore will be delivered and installed to the sleeve by the professional installation vessel. At last, the tower 2 and the wind turbine at the top are installed. So the whole construction process will be completed.

Accordingly, the present invention take use of the monopile foundation support structure which is easy to manufacture, install and constructed with low cost. Wind power generation, wave power generation and tidal power generation will be installed on the same support structure and share the platform and the power transmission system. Thus the power generation cost will be reduced significantly. The stable and reasonable structure further demonstrates that the invention is practical and has significant technical effect.

The invention claimed is:

1. A wind energy, wave energy and tidal energy integrated power generation system based on monopile foundation, which is a power generation system integrating wind turbine, oscillating water column wave energy as well as horizontal-axis tidal energy based on monopile foundation, wherein the wind energy, wave energy and tidal energy integrated power generation system based on monopile foundation comprising a monopile-type wind turbine system, an oscillating water column wave energy converter and a horizontal axis tidal energy converter, the oscillating water column wave energy converter is located at mean sea level around the monopile and the horizontal axis tidal energy converter is located below mean sea level underwater;

the monopile-type wind turbine system comprises wind turbine, tower, monopile foundation and power transmission system; the wind turbine is connected to the monopile foundation through the tower; the monopile foundation is fixed to seabed; the oscillating water column wave energy converter is fixed onto the monopile foundation through a first sleeve; the horizontal axis tidal energy converter comprises outrigger structure and tidal energy generator; two tidal energy generator are installed at the two ends of outrigger structure, the center of the outrigger structure is connected to the monopile foundation by a second sleeve, by adjusting the plane of the tidal energy converter, the axial direction of the tidal energy generator is set to the direction of the incoming flow;

the oscillating water column wave energy converter comprises a cover body of the wave energy converter, wave inlet, air chamber, and an air turbine generator; the air chamber is located inside of the cover body; the wave inlet is set up at one side of the wave energy converter; the air turbine generator are installed at the air outlets respectively which are at the top of the wave energy converter; when the wind energy, wave energy and tidal energy integrated power generation system based on monopile foundation starts to work, the wind energy, wave energy and tidal energy integrated power generation system is put into the water, under the action of waves, the water enter into the air chamber through the wave inlet to form an oscillating water column that oscillates in vertical direction, the oscillating water column moves up and down so that the air in the air chamber reciprocates through the air outlet at the top of the air chamber, and then drives the air turbine generator to generate electricity.

2. The wind energy, wave energy and tidal energy integrated power generation system based on monopile foundation according to claim 1, wherein using a conical air chamber can increase the pressure at the end of the air chamber at the outlet; therefore the air flow could drive the air turbine generator to rotate faster and the power generation efficiency is improved.

3. The wind energy, wave energy and tidal energy integrated power generation system based on monopile foundation according to claim 1, wherein the wave inlet is in the same direction as the main coming direction of the wave to improve the conversion efficiency.

4. The wind energy, wave energy and tidal energy integrated power generation system based on monopile foundation according to claim 1, wherein the air turbine generators is dual-direction air turbine generator.

5. The wind energy, wave energy and tidal energy integrated power generation system based on monopile foundation according to claim 3, wherein the air turbine generators is dual-direction air turbine generator.

6. The wind energy, wave energy and tidal energy integrated power generation system based on monopile foundation according to claim 1, wherein the wind turbine is a MW scale horizontal axis wind turbine, and the tidal energy generator is a horizontal axis tidal energy converter.

7. The wind energy, wave energy and tidal energy integrated power generation system based on monopile foundation according to claim 3, wherein the wind turbine is a MW scale horizontal axis wind turbine, and the tidal energy generator is a horizontal axis tidal energy converter.

8. The wind energy, wave energy and tidal energy integrated power generation system based on monopile foundation according to claim 4, wherein the wind turbine is a MW scale horizontal axis wind turbine, and the tidal energy generator is a horizontal axis tidal energy converter.

9. The wind energy, wave energy and tidal energy integrated power generation system based on monopile foundation according to claim 2, wherein the wave inlet is in the same direction as the main coming direction of the wave to improve the conversion efficiency.

10. The wind energy, wave energy and tidal energy integrated power generation system based on monopile foundation according to claim 2, wherein the air turbine generators is dual-direction air turbine generator.

11. The wind energy, wave energy and tidal energy integrated power generation system based on monopile foundation according to claim 2, wherein the wind turbine is a MW scale horizontal axis wind turbine, and the tidal energy generator is a horizontal axis tidal energy converter.

12. The wind energy, wave energy and tidal energy integrated power generation system based on monopile foundation according to claim 5, wherein the wind turbine is a MW scale horizontal axis wind turbine, and the tidal energy generator is a horizontal axis tidal energy converter.

13. The wind energy, wave energy and tidal energy integrated power generation system based on monopile foundation according to claim 9, wherein the wind turbine is a MW scale horizontal axis wind turbine, and the tidal energy generator is a horizontal axis tidal energy converter.

14. The wind energy, wave energy and tidal energy integrated power generation system based on monopile foundation according to claim 10, wherein the wind turbine is a MW scale horizontal axis wind turbine, and the tidal energy generator is a horizontal axis tidal energy converter.

* * * * *